(12) United States Patent
Tsunogae et al.

(10) Patent No.: US 8,889,806 B2
(45) Date of Patent: Nov. 18, 2014

(54) RING-OPENING POLYMER OF CYCLOPENTENE AND METHOD OF PRODUCTION OF SAME

(75) Inventors: Yasuo Tsunogae, Tokyo (JP); Yoshihisa Takeyama, Tokyo (JP)

(73) Assignee: Zeon Corporation, Tokyo (JP)

( * ) Notice: Subject to any disclaimer, the term of this patent is extended or adjusted under 35 U.S.C. 154(b) by 128 days.

(21) Appl. No.: 13/521,822

(22) PCT Filed: Jan. 14, 2011

(86) PCT No.: PCT/JP2011/050500
§ 371 (c)(1),
(2), (4) Date: Jul. 12, 2012

(87) PCT Pub. No.: WO2011/087072
PCT Pub. Date: Jul. 21, 2011

(65) Prior Publication Data
US 2012/0296035 A1 Nov. 22, 2012

(30) Foreign Application Priority Data

Jan. 14, 2010 (JP) ................................ 2010-005995

(51) Int. Cl.
| | | |
|---|---|---|
| B60C 1/00 | (2006.01) | |
| C08K 3/36 | (2006.01) | |
| C08F 232/04 | (2006.01) | |
| C08F 132/04 | (2006.01) | |
| C08F 32/04 | (2006.01) | |
| C08K 3/04 | (2006.01) | |
| C08F 10/14 | (2006.01) | |
| C08F 110/14 | (2006.01) | |
| C08G 61/08 | (2006.01) | |
| C08F 210/14 | (2006.01) | |
| C08L 65/00 | (2006.01) | |
| C08C 19/25 | (2006.01) | |

(52) U.S. Cl.
CPC ... B60C 1/00 (2013.01); C08K 3/36 (2013.01); C08L 65/00 (2013.01); C08K 3/04 (2013.01); C08G 2261/3321 (2013.01); C08F 10/14 (2013.01); C08F 110/14 (2013.01); C08G 61/08 (2013.01); C08F 210/14 (2013.01); C08C 19/25 (2013.01); C08G 2261/418 (2013.01)
USPC .......................... 526/308; 526/126; 526/128

(58) Field of Classification Search
CPC .. B60C 1/00; C08G 61/08; C08G 2261/3321; C08L 65/00; C08C 19/25; C08F 10/14; C08F 110/14; C08F 210/14
USPC ................................. 526/218, 308, 128, 126
See application file for complete search history.

(56) References Cited

U.S. PATENT DOCUMENTS

| | | | | |
|---|---|---|---|---|
| 3,458,489 | A | * | 7/1969 | Asta et al. ...................... 526/159 |
| 3,857,825 | A | * | 12/1974 | Streck et al. ................... 526/128 |
| 3,920,714 | A | | 11/1975 | Streck |
| 3,920,715 | A | | 11/1975 | Streck et al. |
| 3,929,850 | A | | 12/1975 | Streck et al. |
| 4,396,751 | A | | 8/1983 | Kampf et al. |
| 6,713,534 | B2 | * | 3/2004 | Goerl et al. ..................... 523/333 |

FOREIGN PATENT DOCUMENTS

| | | |
|---|---|---|
| JP | 48-012400 A | 2/1973 |
| JP | 48-062898 A | 9/1973 |
| JP | 50-002800 A | 1/1975 |
| JP | 52-052999 A | 4/1977 |
| JP | 02-049006 A | 2/1990 |
| JP | 2010-202742 A | 9/2010 |

OTHER PUBLICATIONS

Dall'Asta Gino, "Rubber Chemistry and Technology", 1975, vol. 47, pp. 511-596.
International Search Report for PCT/JP2011/050500, mailing date of Apr. 26, 2011.

* cited by examiner

Primary Examiner — Ling Choi
Assistant Examiner — David L Miller
(74) Attorney, Agent, or Firm — Westerman, Hattori, Daniels & Adrian, LLP

(57) ABSTRACT

There is provided a ring-opening polymer of cyclopentene wherein a cis ratio of cyclopentene-derived structural units is 30% or more, the weight average molecular weight (Mw) is 100,000 to 1,000,000, and an oxysilyl group is included at an end of the polymer chain. For example, the ring-opening polymer of cyclopentene can be obtained by ring opening polymerization of cyclopentene in the presence of a compound of a transition metal belonging to Group 6 in the Periodic Table, an organoaluminum compound represented by the following general formula (1), and an olefinically unsaturated hydrocarbon containing an oxysilyl group.

$$(R^1)_{3-x}Al(OR^2)_x \quad (1)$$

(in the general formula (1), $R^1$ and $R^2$ represent a hydrocarbon group having 1 to 20 carbon atoms and x satisfies the requirement $0<x<3$.)

12 Claims, No Drawings

RING-OPENING POLYMER OF CYCLOPENTENE AND METHOD OF PRODUCTION OF SAME

TECHNICAL FIELD

The present invention relates to a ring-opening polymer of cyclopentene and a method for producing the same. More specifically, it relates to a ring-opening polymer of cyclopentene having an excellent rubber property at low temperature, a low heat generation property, and excellent processability and a method for producing the same. The present invention also relates to a rubber composition which is obtained by using the ring-opening polymer of cyclopentene.

BACKGROUND ART

It is generally known that cyclopentene can give an unsaturated linear ring-opening polymer by metathesis ring opening polymerization in the presence of a so-called Ziegler-Natta catalyst consisting of a compound of a transition metal belonging to Group 6 in the Periodic Table like $WCl_6$ and $MoCl_5$ and an organometallic activating agent like triisobutyl aluminum, diethyl aluminum chloride, and tetrabutyl tin.

Conventionally, as the ring-opening polymer of cyclopentene obtained by the process described above, a ring-opening polymer of cyclopentene having a high trans ratio is used from the view point of having crystallinity and excellent green strength. However, although the ring-opening polymer of cyclopentene having a high trans ratio has excellent green strength and wear resistance, due to high crystallinity, it has a poor rubber property at low temperature, and therefore there has been a problem that it cannot be used for various rubbers that are used at low temperature, for example, a rubber material for a tire.

In this connection, a method of lowering crystallinity and improving the rubber property at low temperature of the ring-opening polymer of cyclopentene by increasing the cis ratio of the ring-opening polymer of cyclopentene has been studied. For example, according to Non-Patent Document 1, a ring-opening polymer of cyclopentene having a high cis ratio, non-crystallinity, and glass transition temperature of −100° C. or less is obtained by using $MoCl_5$/triethyl aluminum or $WCl_6$/trialkyl aluminum as a polymerization catalyst.

Meanwhile, it is recently required for a rubber material for a tire, for example, to have excellent cloud resistance, i.e., low heat generation property, to satisfy the low fuel requirements for an automobile. As a method for improving the low heat generation property of a rubber material, a method of adding a filler like silica or carbon black to a rubber material for providing a rubber composition is employed in general. Although the ring-opening polymer of cyclopentene disclosed in Non-Patent Document 1 has low dispersity for a filler like silica and carbon black and thus has an improved property at low temperature, it has a problem that the low heat generation property is poor. Further, since the ring-opening polymer of cyclopentene disclosed in Non-Patent Document 1 has low Moony viscosity, which makes the kneading at high temperature difficult, and therefore there is a problem that the processability is poor.

PRIOR ART DOCUMENTS

Non-Patent Documents

Non-Patent Document 1: Rubber Chemistry and Technology Vol. 47, pp 511-596, 1975

DISCLOSURE OF THE INVENTION

Problem to be Solved by the Invention

Object of the present invention is to provide a ring-opening polymer of cyclopentene having an excellent rubber property at low temperature, a low heat generation property, and excellent processability and method for producing the same. Another object of the present invention is to provide a rubber composition which is obtained by using the ring-opening polymer of cyclopentene.

Means for Solving the Problems

The inventors of the present invention conducted intensive studies to achieve the purpose described above, and as a result found that, by having the ring-opening polymer of cyclopentene in which the cis ratio of cyclopentene-derived structural units is 30% or more and the weight average molecular weight (Mw) is 100,000 to 1,000,000, and by introducing an oxysilyl group to an end of the polymer chain, the purpose can be achieved, and completed the present invention accordingly.

Specifically, according to the present invention, there is provided a ring-opening polymer of cyclopentene wherein a cis ratio of cyclopentene-derived structural units is 30% or more, the weight average molecular weight (Mw) is 100,000 to 1,000,000, and an oxysilyl group is included at an end of the polymer chain.

Preferably, the oxysilyl group is an alkoxysilyl group, an alkylsiloxysilyl group, or a hydroxysilyl group.

Also, according to the present invention, there is provided a method for producing the above ring-opening polymer of cyclopentene wherein the ring-opening polymer of cyclopentene is obtained by ring opening polymerization of cyclopentene in the presence of a compound (A) of a transition metal belonging to Group 6 in the Periodic Table, an organoaluminum compound (B) represented by the following general formula (1), and an olefinically unsaturated hydrocarbon (C) containing oxysilyl group.

$$(R^1)_{3-x}Al(OR^2)_x \qquad (1)$$

(in the above general formula (1), $R^1$ and $R^2$ represent a hydrocarbon group having 1 to 20 carbon atoms and x satisfies the requirement $0<x<3$.)

Also, according to the present invention, there is provided a rubber composition obtained by adding a filler to the above ring-opening polymer of cyclopentene. Preferably, the filler is silica and/or carbon black.

Effects of the Invention

According to the present invention, a ring-opening polymer of cyclopentene having an excellent rubber property at low temperature, a low heat generation property, and excellent processability and a rubber composition which is obtained by using the ring-opening polymer of cyclopentene are provided. In particular, according to the present invention, by having a ring-opening polymer of cyclopentene in which a cis ratio of cyclopentene-derived structural units and the weight average molecular weight (Mw) are within the above range and the oxysilyl group is included at an end of the polymer chain, it is possible to make the ring-opening polymer of cyclopentene superior in processability (in particular, Mooney viscosity) as well as the rubber property at low temperature and low heat generation property.

DESCRIPTION OF EMBODIMENTS (Ring-Opening Polymer of Cyclopentene)

The ring-opening polymer of cyclopentene of the present invention is a ring opened polymer of cyclopentene, wherein a cis ratio of cyclopentene-derived structural units is 30% or more, the weight average molecular weight (Mw) is 100,000 to 1,000,000, and an oxysilyl group is included at an end of the polymer chain.

In the ring-opening polymer of cyclopentene of the present invention, a cis ratio of cyclopentene-derived structural units is 30% or more, preferably 35% or more, and more preferably 40% or more. By having the cis ratio of cyclopentene-derived structural units within the above range, the ring-opening polymer of cyclopentene can have a non-crystalline property and an excellent rubber property at low temperature. If the cis ratio is too low, it has crystallinity at low temperature (for example, −30° C. or less), and thus the rubber property at low temperature deteriorates. Further, as used herein, the expression 'cis ratio of cyclopentene-derived structural units' indicates percentage of structural units derived from cyclopentene in which the carbon-carbon double bond is cis form in the entire structural units derived from cyclopentene which constitute the ring-opening polymer of cyclopentene, and it can be determined by $^{13}$C-NMR spectrum measurement of the ring-opening polymer of cyclopentene.

Further, the upper limit of the cis ratio of cyclopentene-derived structural units of the ring-opening polymer of cyclopentene of the present invention is, although not specifically limited, generally 95% or less, preferably 90% or less, and more preferably 85% or less. The ring-opening polymer of cyclopentene having excessively high cis ratio is difficult to be produced and it may have a poor rubber property at low temperature.

The ring-opening polymer of cyclopentene of the present invention has weight average molecular weight (Mw) of 100,000 to 1,000,000, preferably 120,000 to 900,000, and more preferably 150,000 to 800,000. If the molecular weight is excessively low, the rubber property deteriorates, and therefore undesirable. On the other hand, if the molecular weight is excessively high, production and handling are difficult to be performed. Further, the molecular weight distribution (Mw/Mn) that is obtained as the ratio between the number average molecular weight (Mn) and the weight average molecular weight (Mw) of the ring-opening polymer of cyclopentene is, although not specifically limited, generally 1.1 to 5.0, preferably 1.2 to 4.5, and more preferably 1.3 to 4.0. Further, the weight average molecular weight (Mw) or the molecular weight distribution (Mw/Mn) of the ring-opening polymer of cyclopentene is determined in terms of polystyrene by gel permeation chromatography.

Further, the ring-opening polymer of cyclopentene of the present invention has the oxysilyl group at an end of the polymer chain. The oxysilyl group is a group having a silicon-oxygen bond, and has a chemical structure represented by —Si—O—. According to the present invention, by having the cis ratio of cyclopentene-derived structural units and weight average molecular weight (Mw) within the ranges described above and by introducing the oxysilyl group at an end of the polymer chain, the ring-opening polymer of cyclopentene having excellent processability (in particular, Mooney viscosity) as well as the rubber property at low temperature and low heat generation property can be provided.

Among the oxysilyl groups, from the view point of having high affinity with silica or carbon black that is used as a filler for producing a rubber material for a tire and a high effect of enhancing the low heat generation property of the ring-opening polymer of cyclopentene, an alkoxysilyl group, an aryloxysilyl group, an acyloxysilyl group, an alkylsiloxysilyl group, and an arylsiloxysilyl group are preferable. An alkoxysilyl group and an alkylsiloxysilyl group are more preferable. Further, a hydroxysilyl group obtained by hydrolyzing an alkoxysilyl group, an aryloxysilyl group, or an acyloxysilyl group is also preferable.

The alkoxysilyl group is a group which is formed by bonding of at least one alkoxy group to a silicon atom, and as specific examples thereof, trimethoxysilyl group, (dimethoxy) (methyl)silyl group, (methoxy) (dimethyl)silyl group, (methoxy) (dichloro)silyl group, triethoxysilyl group, (diethoxy) (methyl)silyl group, (ethoxy) (dimethyl)silyl group, (dimethoxy) (ethoxy)silyl group, (methoxy) (diethoxy) silyl group, and tripropoxysilyl group etc. may be mentioned.

The aryloxysilyl group is a group which is formed by bonding of at least one aryloxy group to a silicon atom, and as specific examples thereof, triphenoxysilyl group, (diphenoxy) (methyl)silyl group, (phenoxy) (dimethyl)silyl group, (phenoxy) (dichloro)silyl group, (diphenoxy) (ethoxy)silyl group, and (phenoxy) (diethoxy)silyl group etc. may be mentioned. Of these, (diphenoxy) (ethoxy)silyl group and (phenoxy) (diethoxy)silyl group have an alkoxy group in addition to an aryloxy group, and therefore these are also classified as an alkoxysilyl group.

The acyloxysilyl group is a group which is formed by bonding of at least one acyloxy group to a silicon atom, and as specific examples thereof, triacyloxysilyl group, (diacyloxy) (methyl)silyl group, (acyloxy) (dimethyl)silyl group, and (acyloxy) (dichloro)silyl group etc. may be mentioned.

The alkylsiloxysilyl group is a group which is formed by bonding of at least one alkylsiloxy group to a silicon atom, and as specific examples thereof, tris(trimethylsiloxy)silyl group, trimethylsiloxy(dimethyl)silyl group, triethylsiloxy (diethyl)silyl group, and tris(dimethylsiloxy)silyl group etc. may be mentioned.

The arylsiloxysilyl group is a group which is formed by bonding of at least one arylsiloxy group to a silicon atom, and as specific examples thereof, tris(triphenylsiloxy)silyl group, triphenylsiloxy(dimethyl)silyl group, and tris(diphenylsiloxy)silyl group etc. may be mentioned.

The hydroxysilyl group is a group which is formed by bonding of at least one hydroxy group to a silicon atom, and as specific examples thereof, trihydroxysilyl group, (dihydroxy) (methyl)silyl group, (hydroxy) (dimethyl)silyl group, (hydroxy) (dichloro)silyl group, (dihydroxy) (ethoxy)silyl group, and (hydroxy) (diethoxy)silyl group etc. may be mentioned. Further, of these, (dihydroxy) (ethoxy)silyl group and (hydroxy) (diethoxy)silyl group have an alkoxy group in addition to a hydroxy group, and therefore these are also classified as an alkoxysilyl group.

Further, as the oxysilyl group, in addition to those described above, a linear polysiloxane group represented by the following general formula (2) or a cyclic polysiloxane group represented by the following general formula (3) is also preferable.

[Chemical formula 1]

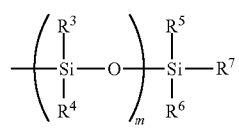

(2)

(in the above general formula (2), $R^3$ to $R^7$ are a group selected from a hydrogen atom, and an alkyl group, an aryl group, an alkoxy group, an aryloxy group, an acyloxy group, an alkylsiloxy group, and an arylsiloxy group having 1 to 10 carbon atoms. Further, in is an integer of 0 to 10.)

[Chemical formula 2]

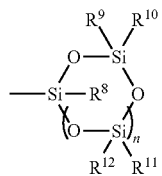

(3)

(in the above general formula (3), $R^8$ to $R^{12}$ are a group selected from a hydrogen atom, and an alkyl group, an aryl group, an alkoxy group, an aryloxy group, an acyloxy group, an alkylsiloxy group, and an arylsiloxy group having 1 to 10 carbon atoms. Further, n is an integer of 1 to 10.)

In addition, in the general formulae (2) and (3), from the view point of having high polymerization activity for obtaining the ring-opening polymer of cyclopentene, $R^3$ to $R^7$ and $R^8$ to $R^{12}$ are preferably a hydrogen atom or an alkyl group having 1 to 6 carbon atoms like a methyl group, an ethyl group, a propyl group, and a cyclohexyl group.

Introduction ratio of the oxysilyl group at an end of the polymer chain of the ring-opening polymer of cyclopentene of the present invention is, although not specifically limited, preferably 10% or more, more preferably 20% or more, furthermore preferably 30% or more, and particularly preferably 40% or more in terms of the ratio of the number of introduced oxysilyl group to the number of polymer chains of the ring-opening polymer of cyclopentene. Higher introduction ratio of the oxysilyl group is more preferable in that better affinity with silica or carbon black as a filler used for producing a rubber material for a tire is obtained and, as a result, the higher effect of enhancing the low heat generation property is obtained. Further, as for the method of measuring the introduction ratio of the oxysilyl group to an end of the polymer chain, although not specifically limited, it can be determined from peak area ratio which corresponds to the oxysilyl group obtained by $^1$H-NMR spectrum measurement and the number average molecular weight in terms of polystyene obtained by gel permeation chromatography.

Further, the ring-opening polymer of cyclopentene of the present invention may contain, in addition to the cyclopentene-derived structural units, cyclic olefin-derived structural units which have a metathesis reactivity other than cyclopentene. However, from the view point of lowering the glass transition temperature of the ring-opening polymer of cyclopentene and consequently keeping the rubber property at low temperature at low level, the content ratio of the cyclopentene-derived structural units is preferably 90 mol % or more, more preferably 95 mol % or more, and furthermore preferably 97 mol % or more. If the content ratio of the cyclopentene-derived structural units is excessively low, glass transition temperature of the ring-opening polymer of cyclopentene becomes higher, and as a result, not only the rubber property at low temperature deteriorates but also the characteristic of the ring-opening polymer of cyclopentene (for example, characteristic as a liner polymer having no short chain branch) is lost, and therefore undesirable.

Mooney viscosity ($ML_{1+4}$, 100° C.) of the ring-opening polymer of cyclopentene of the present invention is preferably 20 to 150, more preferably 22 to 120, and furthermore preferably 25 to 100. Since the ring-opening polymer of cyclopentene of the present invention has the cis ratio of cyclopentene-derived structural units and weight average molecular weight (Mw) that are within the ranges described above and also has the oxysilyl group at an end of the polymer chain, Mooney viscosity is controlled to the above range, and as a result, excellent processability is provided. If Mooney viscosity is excessively low, kneading at high temperature is difficult to be achieved, and as a result, the processability deteriorates. On the other hand, if Mooney viscosity is excessively high, it is difficult to perform the kneading so that the processability also deteriorates.

From the view point of having good rubber property at low temperature, the glass transition temperature of the ring-opening polymer of cyclopentene of the present invention is preferably −98° C. or less, more preferably −99° C. or less, and furthermore preferably −100° C. or less, although it is not specifically limited. Since the ring-opening polymer of cyclopentene of the present invention has a cis ratio of cyclopentene-derived structural units and the weight average molecular weight (Mw) that are within the ranges described above, the glass transition temperature can be controlled to the above level.

(Method for Producing the Ring-Opening Polymer of Cyclopentene)

The ring-opening polymer of cyclopentene of the present invention is produced by ring opening polymerization of cyclopentene in the presence of compound (A) of a transition metal belonging to Group 6 in the Periodic Table, organoaluminum compound (B) represented by the following general formula (1), and olefinically unsaturated hydrocarbon (C) containing the oxysilyl group.

(1)

(in the above general formula (1), $R^1$ and $R^2$ represent a hydrocarbon group having 1 to 20 carbon atoms and x satisfies the requirement 0<x<3.)

(Compound (A) of a Transition Metal Belonging to Group 6 in the Periodic Table)

The compound (A) of a transition metal belonging to Group 6 in the Periodic Table used in the present invention is a compound having a Group 6 transition metal atom of the Periodic Table (long form of the Periodic Table, ditto for the following). Specifically, it is a compound containing a chrome atom; a molybdenum atom, or a tungsten atom. A compound containing a molybdenum atom or a tungsten atom is preferable. From the view point of having high solubility in cyclopentene, a compound containing a tungsten atom is more preferable. The compound (A) of a transition metal belonging to Group 6 in the Periodic Table serves as a polymerization catalyst together with the organoaluminum compound (B) described below. The compound (A) of a transition metal belonging to Group 6 in the Periodic Table is not specifically limited if it is a compound containing a transition metal atom belonging to Group 6 in the Periodic Table. As examples thereof, a halide, an alcoholate, an arylate, an oxide, and an imide compound of a transition metal atom belonging to Group 6 in the Periodic Table etc. may be mentioned. Of these, from the view point of having high polymerization activity, the halide is preferable.

As specific examples of the compound (A) of a transition metal belonging to Group 6 in the Periodic Table, a molybdenum compound such as molybdenum pentachloride, molybdenum oxotetrachloride, and molybdenum (phenylimide)tetrachloride; and a tungsten compound such as tungsten hexachloride, tungsten oxotetrachloride, tungsten (phenylimide)tetrachloride, monocathecolate tungsten tetrachloride, bis(3,5-ditertiarybutyl)cathecolate tungsten dichloride, bis(2-chloroetherate)tetrachloride, and tungsten oxotetraphenolate; etc. may be mentioned.

The use amount of the compound (A) of a transition metal belonging to Group 6 in the Periodic Table is, in terms of molar ratio of "a transition metal atom belonging to Group 6 in the polymerization catalyst:cyclopentene", generally in the range of 1:100 to 1:200,000, preferably 1:200 to 1:150,000, and more preferably 1:500 to 1:100,000. If the use amount of the compound (A) of a transition metal belonging to Group 6 in the Periodic Table is excessively low, the polymerization reaction may not progress to sufficient level. On the other hand, if it is excessively high, it may be difficult to remove the catalyst residues from the ring-opening polymer of cyclopentene to be obtained, and therefore the heat resistance and cold resistance of the ring-opening polymer of cyclopentene to be obtained may be lowered.

(Organoaluminum Compound (B))

The organoaluminum compound (B) used in the present invention is a compound represented by the following general formula (1). The organoaluminum compound (B) serves as a polymerization catalyst together with the compound (A) of a transition metal belonging to Group 6 in the Periodic Table.

$$(R^1)_{3-x}Al(OR^2)_x \tag{1}$$

In the above general formula (1), $R^1$ and $R^2$ represent a hydrocarbon group having 1 to 20 carbon atoms, preferably a hydrocarbon group having 1 to 10 carbon atoms.

As specific examples of $R^1$ and $R^2$, an alkyl group such as methyl group, ethyl group, isopropyl group, n-propyl group, isobutyl group, n-butyl group, t-butyl group, n-hexyl group, cyclohexyl group, n-octyl group, and n-decyl group; and an aryl group such as phenyl group, 4-methylphenyl group, 2,6-dimethylphenyl group, 2,6-diisopropylphenyyl group, and naphthyl group; etc. may be mentioned. Further, although $R^1$ and $R^2$ may be the same or different from each other, from the view point that cis ratio of the ring-opening polymer of cyclopentene to be obtained can be increased and an oxyalkyl group can be efficiently introduced to an end of the polymer chain while the polymerization activity is maintained at high level even in the presence of the olefinically unsaturated hydrocarbon (C) containing the oxysilyl group, at least $R^2$ of $R^1$ and $R^2$ is preferably an alkyl group consisting of sequentially bonded four or more carbon atoms. Particularly, n-butyl group, 2-methyl-pentyl group, n-hexyl group, or cyclohexyl group are preferable.

Further, in the general formula (1), x satisfies the requirement 0<x<3. Specifically, although the composition ratio of $R^1$ and $OR^2$ in the general formula (1) may have any value which satisfies 0<3−x<3 and 0<x<3, respectively, from the view point that the polymerization activity can be enhanced and also the cis ratio of the ring-opening polymer of cyclopentene to be obtained can be improved, x preferably satisfies the requirement 0.5<x<1.5.

The organoaluminum compound (B) represented by the general formula (1) can be synthesized based on the reaction between trialkyl aluminum and alcohol as shown in the following general formula (4), for example.

$$(R^1)_3Al + xR^2OH \rightarrow (R^1)_{3-x}Al(OR^2)_x 30 (R^1)_xH \tag{4}$$

Further, in the above general formula (1), x can be arbitrarily controlled by adjusting the reaction ratio between the trialkyl aluminum and alcohol as shown in the above general formula (4).

Use amount of the organoaluminum compound (B) varies depending on the type of the organoaluminum compound (B) used. It is preferably 0.1 to 100 time mol, more preferably 0.2 to 50 time mol, and furthermore preferably 0.5 to 20 time mol with respect to the transition metal atom belonging to Group 6 in the Periodic Table which constitutes the compound (A) of a transition metal belonging to Group 6 in the Periodic Table. If the use amount of the organoaluminum compound (B) is excessively small, the polymerization activity may become insufficient. On the other hand, if it is excessively high, there is a tendency that a side reaction easily occurs during the ring opening polymerization.

(Olefinically Unsaturated Hydrocarbon (C) Containing Oxysilyl Group)

The olefinically unsaturated hydrocarbon (C) containing oxysilyl group used in the present invention is a compound which has an oxysilyl group and also an olefinic carbon-carbon double bond having metathesis reactivity. By using the olefinically unsaturated hydrocarbon (C) containing oxysilyl group, it is possible to introduce an oxysilyl group at an end of the polymer chain of the ring-opening polymer of cyclopentene.

As the olefinically unsaturated hydrocarbon (C) containing oxysilyl group, the compounds that are represented by the following general formulae (5) to (8) may be mentioned.

[Chemical formula 3]

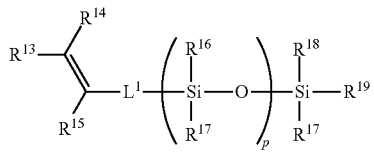

(5)

(in the above general formula (5), $R^{13}$ to $R^{15}$ represent a hydrogen atom or a hydrocarbon group having 1 to 10 carbon atoms and $R^{16}$ to $R^{19}$ are a group selected from a hydrogen atom, and an alkyl group, an aryl group, an alkoxy group, an acyloxy group, an acyloxy group, an alkylsiloxy group, and an arylsiloxy group having 1 to 10 carbon atoms, $L^1$ is a single bond or a divalent group, and p is an integer of 0 to 10, with the proviso that, when p=0, at least one of $R^{17}$ to $R^{19}$ is a group selected from an alkoxy group, an aryloxy group, an acyloxy group, an alkylsiloxy group, and an arylsiloxy group.)

[Chemical formula 4]

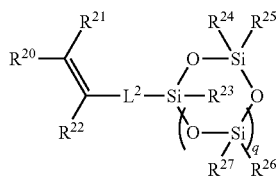

(6)

(in the above general formula (6), $R^{20}$ to $R^{22}$ represent an a hydrogen atom or a hydrocarbon group having 1 to 10 carbon atoms, $R^{23}$ to $R^{27}$ represent a group selected from a hydrogen atom, and an alkyl group, an aryl group, an alkoxy group, an aryloxy group, an acyloxy group, an alkylsiloxy group, and an arylsiloxy group having 1 to 10 carbon atoms, $L^2$ represents a single bond or a divalent group, and q is an integer of 1 to 10.)

[Chemical formula 5]

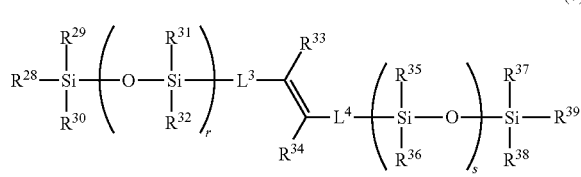

(7)

(in the above general formula (7), $R^{33}$ and $R^{34}$ represent a hydrogen atom or a hydrocarbon group having 1 to 10 carbon atoms, $R^{28}$ to $R^{32}$ and $R^{35}$ to $R^{39}$ represent a group selected from a hydrogen atom, and an alkyl group, an aryl group, an alkoxy group, an aryloxy group, an acyloxy group, an alkylsiloxy group, and an arylsiloxy group having 1 to 10 carbon atoms, $L^3$ and $L^4$ represent a single bond or a divalent group, and r and s are an integer of 0 to 10, with the proviso that, when r=0, at least one of $R^{28}$ to $R^{30}$ is a group selected from an alkoxy group, an aryloxy group, an acyloxy group, an alkylsiloxy group, and an arylsiloxy group, and when s=0, at least one of $R^{37}$ to $R^{39}$ is a group selected from an alkoxy group, an aryloxy group, an acyloxy group, an alkylsiloxy group, and an arylsiloxy group.)

[Chemical formula 6]

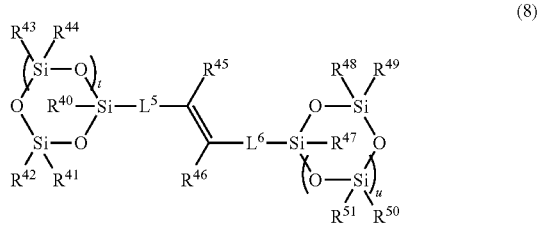

(8)

(in the above general formula (8), $R^{45}$ and $R^{46}$ represent an a hydrogen atom or a hydrocarbon group having 1 to 10 carbon atoms, $R^{40}$ to $R^{44}$ and $R^{47}$ to $R^{53}$ represent a group selected from a hydrogen atom, and an alkyl group, an aryl group, an alkoxy group, an aryloxy group, an acyloxy group, an alkylsiloxy group, and an arylsiloxy group having 1 to 10 carbon atoms, $L^5$ and $L^6$ represent a single bond or a divalent group, and t and u are an integer of 1 to 10.)

In the general formulae (5) to (8), $R^{13}$ to $R^{15}$, $R^{20}$ to $R^{22}$, $R^{33}$, $R^{34}$, $R^{45}$, and $R^{46}$ are preferably a hydrogen atom. When they are a hydrogen atom, the olefinically unsaturated hydrocarbon (C) containing oxysilyl group with more favorable metathesis reactivity can be provided.

Further, in the general formulae (5) to (8), as the divalent group as $L^1$ to $L^6$, although not specifically limited, a divalent group such as a hydrocarbon group, a carbonyl group, an ester group, an ether group, a silyl group, a thioether group, an amino group, an amide group which may have any substituent group, and a group which is obtained as combination of them etc. may be mentioned. Further, the olefinic carbon-carbon double bond with an oxysilyl group may have a constitution containing direct single bond instead of being mediated by a divalent group. From the view point of obtaining the olefinically unsaturated hydrocarbon (C) containing oxysilyl group with more favorable metathesis reactivity, $L^1$ to $L^6$ are preferably a divalent group. Among them, it is preferably a divalent group such as a hydrocarbon group, an ether group, an imino group, an alkylimino group, or a group which is obtained as combination of them. More preferably, it is an aliphatic hydrocarbon group having 1 to 20 carbon atoms or an aromatic hydrocarbon group having 6 to 20 carbon atoms.

Further, when the compound represented by the general formula (5) or (6) is used among the compounds represented by the general formulae (5) to (8), the oxysilyl group can be introduced to one end of the ring-opening polymer of cyclopentene based on the metathesis reaction between them. Further, when the compound represented by the general formula (7) or (8) is used, the oxysilyl group can be introduced to both ends of the ring-opening polymer of cyclopentene based on the metathesis reaction between them.

As specific examples of the preferred compound represented by the general formula (5) or (6), an alkoxysilane compound such as vinyl(trimethoxy)silane, vinyl(triethoxy)silane, allyl(trimethoxy)silane, allyl(methoxy) (dimethyl)silane, allyl(triethoxy)silane, allyl(ethoxy) (dimethyl)silane, styryl(trimethoxy)silane, styryl(triethoxy)silane, 2-styrylethyl(triethoxy)silane, allyl(triethoxysilylmethyl)ether, and allyl(triethoxysilylmethyl)(ethyl)amine; an aryloxysilane compound such as vinyl (triphenoxy)silane, allyl(triphenoxy)silane, and allyl(phenoxy) (dimethyl)silane*; an acyloxysilane compound such as vinyl(triacetoxy)silane, allyl(triacetoxy)silane, allyl(diacetoxy)methylsilane, and allyl (acetoxy) (dimethyl)silane; an alkylsiloxysilane compound such as allyltris(trimethylsiloxy)silane; an arylsiloxysilane compound such as allyltris(triphenylsiloxy)silane; and a polysiloxane compound such as 1-allylheptamethyltrisiloxane, 1-allylnonamethyltetrasiloxane, 1-allylnonamethyloyclopentasiloxane, and 1-allylundecamethylcyclohexasiloxane; etc. may be mentioned.

As specific preferable examples of the compound represented by the general formula (7) or (8), an alkoxysilane compound such as 2-butene-1,4-di(trimethoxysilane), 2-butene-1,4-di(triethoxysilane), and 1,4-di(trimethoxysilylmethoxy)-2-butene; an aryloxysilane compound such as 2-butene-1,4-di(triphenoxysilane); an acyloxysilane compound such as 2-butene-1,4-di(triacetoxysilane); an alkylsiloxysilane compound such as 2-butene-1,4-di[tris(trimethylsiloxy)silane; an arylsiloxysilane compound such as 2-butene-1,4-di[tris(triphenylsiloxy)silane]; and a polysiloxane compound such as 2-butene-1,4-di(heptamethyltrisiloxane), and 2-butene-1,4-di(undecamethylcyclohexasiloxane); etc. may be mentioned.

The use amount of the olefinically unsaturated hydrocarbon (C) containing oxysilyl group can be appropriately selected depending on the molecular weight of the ring-opening polymer of cyclopentene to be produced. In terms of molar ratio with respect to the cyclopentene, it is generally in the range of 1/100 to 1/100,000, preferably 1/200 to 1/50,000, and more preferably 1/500 to 1/10,000. Further, in addition to the function of introducing the oxysilyl group to an end of the polymer chain of the ring-opening polymer of cyclopentene, the olefinically unsaturated hydrocarbon (C) containing oxysilyl group functions as a molecular weight modifier. If the use amount of the olefinically unsaturated hydrocarbon (C) containing oxysilyl group is excessively low, the introduction ratio of the oxysilyl group in the ring-opening polymer of cyclopentene decreases. On the other hand, if it is excessively high, molecular weight of the ring-opening polymer of cyclopentene to be obtained is lowered.

According to the present invention, a oxygen atom-containing hydrocarbon compound may be also used as a polymerization catalyst. By further using a oxygen atom-containing hydrocarbon compound, not only the polymerization activity is enhanced but also the molecular weight of the ring-opening polymer of cyclopentene to be obtained can be increased. The oxygen atom-containing hydrocarbon compound is not specifically limited if it is a hydrocarbon compound in which an oxygen atom is included. Preferably, it is an ester, ketone, or ether compound having 2 to 30 carbon atoms which may have a halogen atom as a substituent group. From the view point of having an excellent effect of enhancing polymerization activity and obtaining high molecular weight at room temperature or above, an ester, ketone, or ether compound having 4 to 10 carbon atoms is preferable. Further, the ester, ketone, or ether compound may be a cyclic ester, ketone, or ether. Still further, it may be a compound containing two or more ester bonds, ketone bonds, or ether bonds in one molecule.

As specific examples of the ester compound, ethyl acetate, butyl acetate, amyl acetate, octyl acetate, 2-chloroethyl acetate, methyl acetyl acrylate, ε-caprolactone, dimethyl glutarate, σ-hexanolactone, and diacetoxyethane etc. may be mentioned.

As specific examples of the ketone compound, acetone, ethyl methyl ketone, acetyl acetone, acetophenone, cyclohexyl phenyl ketone, 1'-acetonaphthone, methyl 2-acetylbenzoate, and 4'-chloroacetophenone etc. may be mentioned.

As specific examples of the ether compound, diethyl ether, tetrahydrofuran, 1,2-dimethoxyethane, ethylene glycol diethyl ether, and 1,4-dioxane etc. may be mentioned.

When the oxygen atom-containing hydrocarbon compound is used, the use amount thereof varies depending on the type of the oxygen atom-containing hydrocarbon compound. However, it is preferably 0.1 to 10 time mol, more preferably 0.2 to 8 time mol, and furthermore preferably 0.5 to 5 time mol with respect to the transition metal atom belonging to Group 6 in the Periodic Table which constitutes the compound (A) of a transition metal belonging to Group 6 in the Periodic Table. If the use amount of oxygen atom-containing hydrocarbon compound is excessively small, there is a tendency that the effect expected from addition of the oxygen atom-containing hydrocarbon compound is difficult to obtain. On the other hand, if it is excessively high, the polymerization activity may become insufficient.

Further, according to the present invention, cyclic olefin having a vinyl group and/or a compound having three or more vinyl groups may be also used for the ring opening polymerization of cyclopentene to introduce a branch structure to the ring-opening polymer of cyclopentene. By using cyclic olefin having a vinyl group and/or a compound having three or more vinyl groups and introducing a branch structure to the ring-opening polymer of cyclopentene, it is possible to improve the hot flow property of the ring-opening polymer of cyclopentene.

The cyclic olefin having a vinyl group is not specifically limited if it is a cyclic olefin containing at least one vinyl group. As examples thereof, although not specifically limited, a monocyclic olefin having a vinyl group such as 4-vinylcyclopentene and 5-vinylcyclooctene; and norbornenes having a vinyl group such as 5-vinylnorbornene, 5-propenylnorbornene, and 5-styrylnorbornene; may be mentioned.

As the compound having three or more vinyl groups, a compound having three vinyl groups such as 1,2,4-trivinylcyclohexane and 1,3,5-trivinylcyclohexane; and a compound having 4 or more vinyl groups such as divinyl benzene oligomer and 1,2-polybutadiene oligomer; etc. may be mentioned.

When the cyclic olefin having a vinyl group and/or the compound having three or more vinyl groups is used, the use amount thereof is 0.001 to 1 mol %, preferably 0.002 to 0.9 mol %, and more preferably 0.005 to 0.8 mol % with respect to the cyclopentene.

(Ring Opening Polymerization)

According to the production method of the present invention, ring opening polymerization of cyclopentene is carried out by contacting cyclopentene with the compound (A) of a transition metal belonging to Group 6 in the Periodic Table, the organoaluminum compound (B), and the olefinically unsaturated hydrocarbon (C) containing oxysilyl group described above.

The method for initiating the ring opening polymerization by bringing them into contact with one another is not specifically limited. For example, ring opening polymerization of cyclopentene can be initiated by adding the compound (A) of a transition metal belonging to Group 6 in the Periodic Table in the presence of cyclopentene and the organoaluminum compound (B). Alternatively, it is also possible that the compound (A) of a transition metal belonging to Group 6 in the Periodic Table is mixed in advance with the organoaluminum compound (B) and cyclopentene is added thereto to initiate the ring opening polymerization of cyclopentene.

Further, the olefinically unsaturated hydrocarbon (C) containing oxysilyl group may be mixed with cyclopentene in advance or mixed with cyclopentene at the time of carrying out the ring opening polymerization. Still further, it is also possible that the ring opening polymerization of cyclopentene is carried out first and the olefinically unsaturated hydrocarbon (C) containing oxysilyl group is added to the ring opened polymer obtained therefrom to perform the metathesis reaction with the ring opened polymer.

With regard to the method for producing the ring-opening polymer of cyclopentene of the present invention, the ring opening polymerization may be carried out in the absence or presence of a solvent. If the ring opening polymerization is carried out in the presence of a solvent, the solvent used therefor is not specifically limited, if it is a solvent inert to the polymerization and capable of dissolving cyclopentene and other polymerizable cyclic olefin, the compound (A) of a transition metal belonging to Group 6 in the Periodic Table, the organoaluminum compound (B), and the olefinically unsaturated hydrocarbon (C) containing oxysilyl group that are used for the ring opening polymerization. However, a hydrocarbon solvent is preferably used. As specific examples of the hydrocarbon solvent, an aromatic hydrocarbon such as benzene, toluene, xylene, and ethyl benzene; an aliphatic hydrocarbon such as n-hexane, n-heptane, and n-octane; and an alicyclic hydrocarbon such as cyclohexane, cyclopentane, and methylcyclohexane; may be mentioned.

According to the method for producing the ring-opening polymer of cyclopentene of the present invention, the polymerization temperature is preferably −100° C. or higher, more preferably −50° C. or higher, furthermore preferably 0° C. or higher, and particularly preferably 20° C. or higher. In addition, the upper limit of the polymerization temperature is, although not specifically limited, preferably less than 100° C., more preferably less than 90° C. furthermore preferably less than 80° C., and particularly preferably less than 70° C. According to the production method of the present invention, since the compound (A) of a transition metal belonging to Group 6 in the Periodic Table and the organoaluminum compound (B) are used for performing the ring opening polymerization of cyclopentene, cyclopentene with high cis ratio and high molecular weight can be obtained even at relatively high temperature condition like 20° C. or higher. Further, the ring-opening polymer of cyclopentene can be obtained with high yield. If the polymerization temperature is excessively high, the ring-opening polymer of cyclopentene with excessively small molecular weight may be obtained. On the other hand, if the polymerization temperature is excessively low, the polymerization rate is slowed down, and as a result, productivity may be impaired.

The polymerization time is preferably 1 minute to 72 hours, and more preferably 10 minutes to 20 hours.

With regard to the method for producing the ring-opening polymer of cyclopentene of the present invention, the compound (A) of a transition metal belonging to Group 6 in the Periodic Table, the organoaluminum compound (B), and the olefinically unsaturated hydrocarbon (C) containing oxysilyl group are brought into contact with cyclopentene to initiate the ring opening polymerization. After the polymerization conversion ratio reaches the pre-determined value, well known polymerization terminator is added to the polymerization system for termination, and the ring-opening polymer of cyclopentene is obtained accordingly.

Further, when the ring-opening polymer of cyclopentene is prepared to have a hydroxysilyl group at an end of the polymer chain, a compound having an alkoxysilyl group, an aryloxysilyl group, or an acyloxysilyl group is used as the olefinically unsaturated hydrocarbon (C) containing oxysilyl group and also the ring opened polymer obtained is subjected to hydrolysis after terminating the polymerization reaction. The hydrolysis can be generally carried out by adding a predetermined amount of water to an organic solvent solution of the ring-opening polymer followed by stirring of the mixture. Addition amount of water is, although not specifically limited, preferably the same or higher molar amount than the oxygen atom of the oxysilyl group. As for the method of adding water for hydrolysis, any method including adding an appropriate amount to an organic solvent and slowly incorporating water by using moisture in air atmosphere can be employed.

Further, for carrying out the hydrolysis, the hydrolysis reaction rate is preferably controlled by using an acid or a base catalyst. As the acid that can be used, an inorganic acid such as hydrochloric acid, nitric acid, and sulfuric acid; and an organic acid such as acetic acid and oxalic acid; etc. may be mentioned. Further, as the base, hydroxide such as sodium hydroxide, potassium hydroxide, magnesium hydroxide, and calcium hydroxide; carbonate such as sodium carbonate and potassium carbonate; and an organic base such as pyridine and triethylamine; etc. may be mentioned.

Reaction temperature for the hydrolysis is 0° C. to 250° C. and preferably 50° C. to 200° C. Further, the reaction time for the hydrolysis is generally 1 minute to 100 hours.

The organic solvent used for the hydrolysis is not specifically limited if it can dissolve the ring-opening polymer of cyclopentene. As examples thereof, an ether-based solvent such as tetrahydrofuran and dibutyl ether; a halogen-based solvent such as chloroform and chlorobenzene; and a hydrocarbon-based solvent such as benzene, toluene, xylene, ethyl benzene, n-hexane, and cyclohexane; etc. may be mentioned. In addition, the unreacted cyclopentene remained after the polymerization may be also used as a solvent. Each of the solvents may be used either singly or in combination of two or more.

Further, according to the present invention, an anti-aging agent such as a phenol-based stabilizer, a phosphorus-based stabilizer, and a sulfur-based stabilizer may be added to the ring-opening polymer obtained, if desired. The addition amount of the anti-aging agent may be appropriately determined based on the type of the agent or the like. Further, according to the present invention, an extender oil may be also added, if desired.

Further, when the polymerization is carried out in the presence of a solvent by using a solvent, a method for collecting the polymer from a polymer solution is not specifically limited and any method well known in the art can be employed. For example, a method including separating a solvent by steam stripping or the like, isolating the solid by filtration, and drying the solid to obtain solid state rubber can be employed.

(Rubber Composition)

The rubber composition of the present invention is obtained by adding a filler to the ring-opening polymer of cyclopentene of the present invention described above.

The filler is not specifically limited and silica and/or carbon black may be mentioned.

As specific examples of the silica as a filler, white carbon by dry method, white carbon by wet method, colloidal silica, and precipitated silica may be mentioned carbon-silica dual phase filler in which silica is supported on carbon black surface can be also used. Of these, white carbon by wet method containing hydrous silicic acid as a main component is preferable. The above component may be used either singly or in combination of two or more.

The silica as a filler has specific surface area by nitrogen adsorption of preferably 50 to 300 $m^2/g$, more preferably 80 to 220 $m^2/g$, and particularly preferably 100 to 170 $m^2/g$. By having the specific surface area within the range, it is possible to make the obtained rubber composition more superior in low heat generation. Further, pH of the silica is preferably less than 7 and more preferably 5 to 6.9. Further, the specific surface area by nitrogen adsorption can be measured by BET method with reference to ASTM D3037-81.

When silica is used as a filler, the addition amount of the silica is preferably 1 to 150 parts by weight, more preferably 10 to 120 parts by weight, furthermore preferably 15 to 100 parts by weight, and particularly preferably 20 to 80 parts by weight with respect to 100 parts by weight of the rubber component in the rubber composition. By having the addition amount of silica within the range, it is possible to make the rubber composition particularly superior in low heat generation. When the addition amount of silica is excessively low or high, the low heat generation property of the rubber composition may be impaired.

From the view point of further improving the low heat generation property of the rubber composition, it is preferable that a silane coupling agent is additionally added when silica is used as a filler. As the silane coupling agent, for example, vinyltriethoxysilane, β-(3,4-epoxycyclohexyl)ethyltrimethoxysilane, N-(β-aminoethyl)-γ-aminopropyltrimethoxysilane, 3-octathio-1-propyl-triethoxysilane, bis(3-(triethoxysilyl)propyl)disulfide, bis(3-(triethoxysilyl)propyl) tetrasulfide, γ-trimethoxysilylpropyl dimethylthiocarbamyl tetrasulfide, and γ-trimethoxysilylpropylbenzothiazyl tetrasulfide etc. may be mentioned. Of these, from the view point of avoiding scorching during kneading, an agent with four or less sulfurs contained per one molecule is preferable. Each of the silane coupling agents may be used either singly or in combination of two or more. The addition amount of the silane coupling agent is preferably 0.1 to 30 parts by weight, and more preferably 1 to 15 parts by weight with respect to 100 parts by weight of silica.

As the carbon black as a filler, furnace black, acetylene black, thermal black, channel black, and graphite etc. may be mentioned. Of these, furnace black is preferably used and SAF, ISAF, ISAF-HS, ISAF-LS, IISAF-HS, HAF, HAF-HS, HAF-LS, T-HS, T-NS, MAF, and FEF etc. may be mentioned as specific examples thereof. Each of them may be used either singly or in combination of two or more.

The carbon black as a filler has specific surface area by nitrogen adsorption of preferably 5 to 200 $m^2/g$, more preferably 20 to 130 $m^2/g$, and furthermore preferably 40 to 80 m²/g. Further, the carbon black as a filler has dibutyl phthalate (DBP) adsorption amount of preferably 5 to 200 mL/100 g, more preferably 50 to 160 mL/100 g, and furthermore preferably 70 to 130 mL/100 g. When carbon black has the specific surface area and dibutyl phthalate adsorption amount within the range, it is possible to make the rubber composition have good moldability and an excellent low heat generation property.

When carbon black is used as a filler, the addition amount thereof is preferably 1 to 150 parts by weight, more preferably 2 to 120 parts by weight, furthermore preferably 15 to 100 parts by weight, and particularly preferably 30 to 80 parts by weight with respect to 100 parts by weight of the rubber component in the rubber composition. By having the addition amount of carbon black within the range, it is possible to make the rubber composition particularly superior in low heat generation. When the addition amount of carbon black is excessively low or high, the low heat generation property of the rubber composition may be impaired.

Further, when both the silica and carbon black are added to the rubber composition of the present invention, total amount of the silica and carbon black is preferably 25 to 120 parts by weight and more preferably 30 to 100 parts by weight per 100 parts by weight with respect to the rubber component in the rubber composition.

The rubber composition of the present invention preferably contains, as a rubber component, additional rubber other than the ring-opening polymer of cyclopentene of the present invention described above. As the additional rubber, natural rubber, polyisoprene rubber, emulsion polymerization styrene-butadiene copolymerization rubber, solution polymerization styrene-butadiene copolymerization rubber, polybutadiene rubber (it may be also polybutadiene rubber containing crystalline fiber consisting of 1,2-polybutadiene polymer), styrene-isoprene copolymerization rubber, butadiene-isoprene copolymerization rubber, styrene-isoprene-butadiene copolymerization rubber, acrylonitrile-butadiene copolymerization rubber, and acrylonitrile-styrene-butadiene copolymerization rubber etc. may be mentioned. Of these, natural rubber, polyisoprene rubber, polybutadiene rubber, and styrene-butadiene copolymerization rubber are preferably used. Each of them may be used either singly or in combination of two or more.

When the rubber composition of the present invention is added with additional rubber other than the ring-opening polymer of cyclopentene, content ratio of the ring-opening polymer of cyclopentene is preferably 5 to 90 wt %, more preferably 10 to 80 wt %, and furthermore preferably 20 to 70 wt % in the rubber components. By having the content ratio of the ring-opening polymer of cyclopentene within the range, it is possible to make the rubber composition favorable in moldability and excellent in low heat generation property.

If necessary, according to a common method, the rubber composition of the present invention may be also added with additives such as crosslinking agents, crosslinking accelerators, crosslinking activators, anti-aging agents, activators, process oils, plasticizers, lubricants, fillers, tackifying agents, and aluminum hydroxide, each in a required amount, in addition to the components described above.

As the crosslinking agent, sulfur, sulfur hydride, organic peroxides, quinone dioximes, an organic polyvalent amine compound, and an alkylphenol resin having a methylol group etc. may be mentioned. Of these, sulfur is preferably used. Addition amount of the crosslinking agent is preferably 1.0 to 5.0 parts by weight, more preferably 1.2 to 4.0 parts by weight, furthermore preferably 1.4 to 3.0 parts by weight, and most preferably 1.9 to 3.0 parts by weight with respect to 100 parts by weight of the rubber components that are contained in the rubber composition.

As the crosslinking accelerator, a sulfene amide-based crosslinking accelerator such as N-cyclohexyl-2-benzothiazyl sulfene amide, N-t-butyl-2-benzothiazol sulfene amide, N-oxyethylene-2-benzothiazol sulfene amide, N-oxyethylene-2-benzothiazol sulfene amide, and N,N'-diisopropyl-2-benzothiazol sulfene amide; a guanidine-based crosslinking accelerator such as diphenyl guanidine, diorthotolyl guanidine, and orthotolyl guanidine; a thiourea-based crosslinking accelerator; a thiazole-based crosslinking accelerator; a thiuram-based crosslinking accelerator; a dithiocarbamic acid-based crosslinking accelerator; and a xanthogenic acid-based crosslinking accelerator; etc. may be mentioned. Of these, it is particularly preferable that the sulfene amide-based crosslinking accelerator is contained. Each of the crosslinking accelerators may be used either singly or in combination of two or more. The addition amount of the crosslinking accelerator is preferably 0.1 to 15 parts by weight, more preferably 0.5 to 5 parts by weight, and particularly preferably 1.0 to 4.0 parts by weight with respect to 100 parts by weight of the rubber components that are contained in the rubber composition.

As the crosslinking activator, higher fatty acid such as stearic acid and zinc oxide. The addition amount of the crosslinking activator is, although not specifically limited, the addition amount when the higher fatty acid is used as a crosslinking activator is preferably 0.05 to 15 parts by weight, and more preferably 0.5 to 15 parts by weight with respect to 100 parts by weight of the rubber components that are contained in the rubber composition. The addition amount when the zinc oxide is used as a crosslinking activator is preferably 0.05 to 10 parts by weight, and more preferably 0.5 to 3 parts by weight with respect to 100 parts by weight of the rubber components that are contained in the rubber composition.

As the process oil, a petroleum based softening agent such as paraffin based one, aromatic based one, and naphthene based one; a plant based softening agent; and fatty acids; etc. may be mentioned.

As the additional additives, an activator such as diethylene glycol, polyethylene glycol, and silicone oil; a filler such as calcium carbonate, talc, and clay; a tackifying agent such as petroleum resin and cumeron rein; wax; etc. may be mentioned.

For obtaining the rubber composition of the present invention, each component is kneaded according to a common method. For example, by kneading the additives except crosslinking agents and crosslinking accelerators, fillers, and rubber components followed by adding crosslinking agents and crosslinking accelerators to the kneaded mixture, a desired composition can be obtained. The temperature for kneading the additives except crosslinking agents and crosslinking accelerators with the rubber components is preferably 80 to 200° C., and more preferably 120 to 180° C. Further, the kneading time is preferably 30 seconds to 30 minutes. Mixing of a kneaded mixture with crosslinking agents and crosslinking accelerators is generally performed after cooling to 100° C. or less, preferably 80° C. or less. Further, for obtaining the rubber composition of the present invention, any method of adding the additives and fillers to solid state rubber followed by kneading (dry kneading) and adding the additives and fillers to a solution of rubber followed by solidifying and drying (wet kneading) can be employed.

The ring-opening polymer of cyclopentene and rubber composition of the present invention have an excellent rubber property at low temperature, a low heat generation property, and processability (Mooney viscosity, in particular). For such reasons, based on such properties, the ring-opening polymer of cyclopentene and rubber composition of the present invention can be used for various applications, for example, several parts of a tire such as thread, carcass, side wall, and a bead part, rubber products such as hoses, window frames, belts, shoe soles, sound-damping rubbers, and automobile parts. It can be also used as resin reinforced rubbers for anti-shock polystyrene and ABS resin. Since the ring-opening polymer of cyclopentene and rubber composition of the present invention have excellent affinity and dispersity for a filler such as silica and carbon black, in particular, it can be preferably used for an application in which such filler is also used, in particular, for thread of a tire including all-season tires, high performance tires, and studless tires and also as materials for side wall, an under thread, carcass, and a bead part.

EXAMPLES

Below, the present invention will be explained further based on detailed examples, but the present invention is not limited to these examples. Further, below, the term "part" is based on weight, unless specifically described otherwise. Further, the test and evaluation were made according to the followings.

<Molecular Weight>

Molecular weight was determined in terms of polystyrene by performing gel permeation chromatography. Specifically, the measurements were made under the following conditions.

Measurement apparatus: High performance liquid chromatography (trade name: HLC-8220, made by TOSOH CORPORATION)

Column: two GMH-HR-H columns (trade name, made by TOSOH CORPORATION) were connected in series Detector: differential refractometer (trade name: RI-8220, made by TOSOH CORPORATION)

Elution liquid: tetrahydrofuran

Column temperature: 40° C.

<Cis/Trans Ratio>

Cis/trans ratio of the ring-opening polymer of cyclopentene was obtained by $^{13}C$-NMR spectrum measurement.

<Oxysilyl Group Introduction Ratio>

According to $^{1}H$-NMR spectrum measurement of the ring-opening polymer of cyclopentene, integrated peak value specific to oxysilyl group and integrated peak value originating from olefin were measured. Thereafter, based on the ratio of the measured peak integrated values and the result of number average molecular weight (Mn) measured by GPC as described above, the introduction ratio of oxysilyl group was calculated. The introduction ratio of oxysilyl group was defined as the ratio of the number of oxysilyl group with respect to the number of the ring-opening polymer of cyclopentene chain. That is, oxysilyl group introduction ratio of 100% represents a state in which one oxysilyl group is introduced per one polymer chain.

<Mooney Viscosity ($ML_{1+4}$, 100° C.)>

Mooney viscosity $M_{1+4}$, 100° C.) of the ring-opening polymer of cyclopentene was measured with reference to JIS K6300.

<Melting point (Tm) and Glass Transition Temperature (Tg)>

Melting point (Tm) and glass transition temperature (Tg) of the ring-opening polymer of cyclopentene were measured by using a differential scanning calorimetry (DSC) with the temperature increase rate of 10° C./minute.

<Low Heat Generation Property>

The rubber composition was subjected to press crosslinking for 20 minutes at 150° C. to give a test specimen, which was then measured for tanδ at 60° C. by using a viscoelasticity measurement apparatus (trade name: EPLEXOR, made by Gabo Qualimeter) under the condition including initial deformation of 0.5%, dynamic deformation of 1%, and 10 Hz. When the measurement value of the sample of Comparative example 4 described later was 100, the obtained result was calculated as an index compared to it. Smaller index value indicates better low heat generation property.

Reference example 1

Preparation of diisobutyl aluminum mono(n-hexoxide)/toluene solution (2.5 wt %)

Under the nitrogen atmosphere, 88 parts of toluene and 7.8 parts of 25.4 wt % of triisobutyl aluminum/n-hexane solution (made by TOSOH FINECHEM CORPORATION) were added to a glass vessel containing a stir bar. After cooling to −45° C., 1.02 parts of n-hexanol (the same molar amount as triisobutyl aluminum) were slowly added dropwise under vigorous stirring. After that, the mixture was kept under stirring until it reached the room temperature to prepare diisobutyl aluminum mono(n-hexoxide)/toluene solution (2.5 wt %).

Reference example 2

Preparation of diisobutyl aluminum mono(n-butoxide)/toluene solution (2.5 wt %)

Except for using 0.74 part of n-butanol (the same molar amount as triisobutyl aluminum) instead of 1.02 parts of n-hexanol (the same molar amount as triisobutyl aluminum), the same procedure was followed as in Reference example 1 to prepare diisobutyl aluminum mono(n-butoxide)/toluene solution (2.5 wt %).

Example 1

Under the nitrogen atmosphere, 8.7 parts of 1.0 wt % of $WCl_6$/toluene solution and 4.3 parts of 2.5 wt % of diisobutyl aluminum mono(n-hexoxide)/toluene solution prepared in Reference example 1 were added to a glass vessel containing a stir bar and stirred for 15 minutes to obtain a catalyst solution. Under the nitrogen atmosphere, 150 parts of cyclopentene and 0.22 part of allyl triethoxy silane were added to a pressure resistant glass reaction vessel equipped with a stirrer. 13 parts of the catalyst solution prepared above were added thereto and the polymerization reaction was allowed to occur for 6 hours at 25° C. After the polymerization reaction for 6 hours, an excess amount of isopropanol was added to the pressure resistant glass reaction vessel to terminate the reaction. The solution inside the pressure resistant glass reaction vessel was then poured over large excessive amount of isopropanol containing 2,6-di-t-butyl-p-cresol (BHT). Subsequently, precipitated polymer was collected, washed with isopropanol, and dried under vacuum at 40° C. for 3 days. As a result, 76 parts of the ring-opening polymer of cyclopentene were obtained.

60 parts of the ring-opening polymer of cyclopentene obtained above and 40 parts of natural rubber were masticated for 30 seconds in a Banbury mixer (250 mL volume) and subsequently added with 35 parts of silica I (trade name: ZEOSIL 1165MP, made by RHODIA, specific surface area by nitrogen adsorption (BET method): 163 m²/g) and 2.8 parts of a silane coupling agent (bis(3-(triethoxysilyl)propyl) disulfide, trade name: Si75, made by DEGUSSA). Next, with the initiation temperature for kneading of 80° C., the mixture was kneaded for 1.5 minutes and then added with 10 parts of carbon black (trade name: SEAST SO, made by TOKAI CARBON Co., Ltd., specific surface area by nitrogen adsorption (BET method): 42 m²/g), 5 parts of process oil (trade name: FUKKOL ELAMIC 30, made by Nippon Oil Corporation), 3 parts of zinc oxide (Zinc oxide No. 1), 2 parts of stearic acid (trade name: SA-300, made by ADEKA CORPORATION), 2 parts of an anti-aging agent (N-phenyl-N'-(1,3-dimethylbutyl)-p-phenylene diamine, trade name: NOCRAC 6C, made by OUCHI SHINKO CHEMICAL INDUSTRIAL CO., LTD.), and 2 parts of wax (trade name: SUNNOC, made by OUCHI SHINKO CHEMICAL INDUSTRIAL CO., LTD.), and then kneaded for 2.5 minutes. After the kneading was completed, the kneaded rubber mixture was discharged from the Banbury mixer. The kneaded rubber mixture obtained was cooled to room temperature and kneaded again in Banbury mixer for 3 minutes. After the kneading is completed, the kneaded rubber mixture was discharged from the Banbury mixer. Subsequently, by using 50° C. open roll, 2 parts of sulfur and 2 parts of a crosslinking accelerator (mixture of 1.5 parts of N-t-butyl-2-benzothiazolyl sulfene amide (trade name: NOCCELER NS, made by OUCHI SHINKO CHEMICAL INDUSTRIAL CO., LTD.) and 0.5 part of diphenyl guanidine (trade name: NOCCELER D, made by OUCHI SHINKO CHEMICAL INDUSTRIAL CO., LTD.)) were added and kneaded with the rubber mixture obtained. As a result, a sheet-shaped rubber composition was obtained.

Thereafter, the cyclopentene polymer obtained was tested in accordance with the above described method to measure molecular weight, cis/trans ratio, oxysilyl group introduction ratio, Mooney viscosity ($ML_{1+4}$, 100° C.), melting point (Tm), and glass transition temperature (Tg). The rubber composition obtained was tested to measure the low heat generation property. The results are described in Table 1. Further, even after the cyclopentene polymer obtained was left in a −30° C. freezer for 3 days, it maintained the rubber state.

Example 2

30 parts of the ring-opening polymer of cyclopentene obtained in the same manner as Example 1 were dissolved in 150 parts of tetrahydrofuran. After adding 2.5 parts of 1 N aqueous hydrochloric acid solution, the mixture was stirred for 4 hours at 80° C. to perform the hydrolysis reaction (hydrolysis reaction by reacting triethoxysilyl group for conversion into trihydroxysilyl group). After the hydrolysis was completed, the mixture was poured over large excessive amount of isopropanol containing 2,6-di-t-butyl-p-cresol (BHT). Subsequently, precipitated polymer was collected, washed with isopropanol, and dried under vacuum at 40° C. for 3 days. As a result, 30 parts of the ring-opening polymer of cyclopentene were obtained. In this regard, as a result of performing ¹H-NMR measurement of the ring-opening polymer of cyclopentene obtained, it was found that the peak derived from an ethyl group of the triethoxysilyl group had almost disappeared and at least 99% of the triethoxysilyl group was hydrolyzed to a trihydroxysilyl group. Further, a rubber composition was also obtained in the same manner as Example 1 by using the ring-opening polymer of cyclopentene obtained. The cyclopentene polymer and the rubber composition obtained were evaluated in the same manner as Example 1. The results are described in Table 1. Further, even after the polymer obtained was left in a −30° C. freezer for 3 days, it maintained the rubber state.

Example 3

Under the nitrogen atmosphere, 8.7 parts of 1.0 wt % of $WCl_6$/toluene solution and 4.3 parts of 2.5 wt % of diisobutyl aluminum mono(n-butoxide)/toluene solution prepared in Reference example 2 were added to a glass vessel containing a stir bar and stirred for 10 minutes. After that, 0.039 part of ethyl acetate were added thereto and stirred for 10 minutes to obtain a catalyst solution. Under the nitrogen atmosphere, 150 parts of cyclopentene and 0.29 part of 2-styrylethyltrimethoxysilane were added to a pressure resistant glass reaction vessel equipped with a stirrer. 13 parts of the catalyst solution prepared above were added thereto and the polymerization reaction was allowed to occur for 6 hours at 25° C. After the polymerization reaction for 6 hours, an excess amount of isopropanol was added to the pressure resistant glass reaction vessel to terminate the reaction. The solution inside the pressure resistant glass reaction vessel was then poured over large excessive amount of isopropanol containing 2,6-di-t-butyl-p-cresol (BHT). Subsequently, precipitated polymer was collected, washed with isopropanol, and dried under vacuum at 40° C. for 3 days. As a result, 99 parts of the ring-opening polymer of cyclopentene were obtained. Subsequently, a rubber composition was also obtained in the same manner as Example 1. The cyclopentene polymer and the rubber composition obtained were evaluated in the same manner as Example 1. The results are described in Table 1. Further, even after the polymer obtained was left in a −30° C. freezer for 3 days, it maintained the rubber state.

Example 4

Under the nitrogen atmosphere, 8.7 parts of 1.0 wt % of $WCl_6$/toluene solution and 4.3 parts of 2.5 wt % of diisobutyl aluminum mono(n-hexoxide)/toluene solution were added to a glass vessel containing a stir bar and stirred for 10 minutes. After that, by adding 0.039 part of 1,4-dioxane followed by stirring for 10 minutes, a catalyst solution was obtained. Under the nitrogen atmosphere, 150 parts of cyclopentene and 210 parts of toluene were added to a pressure resistant glass reaction vessel equipped with a stirrer. 13 parts of the catalyst solution prepared above were added thereto and the polymerization reaction was allowed to occur for 6 hours at 25° C. A small amount of the polymerization solution obtained was sampled and analyzed. As a result, it was found the polymerization conversion ratio was 45% while Mw=451,400 and Mw/Mn=2.37. Subsequently, solution of 10 parts of toluene in which 0.37 part of allyl tris(trimethylsiloxy)silane were dissolved were added to the pressure resistant glass reaction vessel and the polymerization reaction was performed for 10 hours at 25° C. After 10 hours of the polymerization reaction, termination of the polymerization reaction, recovery of the polymer, washing and vacuum drying were carried out in the same manner as Example 1 to obtain 92 parts of the ring-opening polymer-of cyclopentene (polymerization conversion ratio: 61%). Further, a rubber composition was also obtained in the same manner as Example 1. The cyclopentene polymer and the rubber composition obtained were evaluated in the same manner as Example 1. The results are described in Table 1. Further, even after the polymer obtained was left in a −30° C. freezer for 3 days, it maintained the rubber state.

Example 5

Under the nitrogen atmosphere, 150 parts of cyclopentene, 0.22 part of allyl triethoxy silane, and 0.13 part of vinyl norbornene were added to a pressure resistant glass reaction vessel equipped with a stirrer. Subsequently, 4.3 parts of 2.5 wt % of diisobutyl aluminum mono(n-hexoxide)/toluene solution were added thereto and stirred. Finally, 8.7 parts of 1.0 wt % of WCl$_6$/toluene solution were added thereto to initiate the polymerization and the polymerization reaction was allowed to occur for 16 hours at 25° C. After 16 hours of the polymerization reaction, termination of the polymerization reaction, recovery of the polymer, washing, and vacuum drying were carried out in the same manner as Example 1 to obtain 78 parts of the ring-opening polymer of cyclopentene. Further, a rubber composition was also obtained in the same manner as Example 1. The cyclopentene polymer and the rubber composition obtained were evaluated in the same manner as Example 1. The results are described in Table 1. Further, even after the polymer obtained was left in a −30° C. freezer for 3 days, it maintained the rubber state.

Example 6

Except for, when preparing a rubber composition, using 35 parts of silica II (trade name: ZEOSIL 1115MP, made by RHODIA, specific surface area by nitrogen adsorption (BET method): 112 m$^2$/g) instead of 35 parts of silica I and addition amount of the silane coupling agent was changed from 2.8 parts to 1.8 parts, the same procedure was followed as in Example 1 to obtain a rubber composition. The rubber composition obtained was tested for measuring the low heat generation property. The results are given in Table Comparative Example 1

Except for using 10.1 parts of 1.0 wt % of diisobutyl aluminoxane/toluene solution (made by TOSOH FINECHEM CORPORATION) instead of 4.3 parts of 2.5% by weight of diisobutyl aluminum mono(n-hexoxide)/toluene solution, the polymerization reaction was carried out in the same manner as Example 1. However, it was not able to obtain a polymer in Comparative example 1.

Comparative Example 2

Except for using 1.1 parts of tetra(n-butyl) tin instead of 4.3 parts of 2.5 wt % of diisobutyl aluminum mono(n-hexoxide)/toluene solution, the same procedure was followed as in Example 1 to obtain 12 parts of the ring-opening polymer of cyclopentene. The cyclopentene polymer obtained was evaluated in the same manner as Example 1. The results are given in Table 1. However, the cyclopentene polymer of Comparative example 2 had small molecular weight and was in a liquid phase at room temperature, and thus it was difficult to measure Mooney viscosity. Further, no rubber composition was able to be obtained. Further, after keeping the polymer obtained in a −30° C. freezer for 3 days, the obtained polymer was transformed into a resin state, and therefore it was found to be inappropriate for various uses as a rubber like a use in tire.

Comparative Example 3

Except for using a polymerization catalyst solution in which 0.19 part of (1,3-dimesitylimidazolidin-2-ylidene)(tricyclohexylphosphine)benzylidene ruthenium dichloride are dissolved in 10 parts of toluene instead of 8.7 parts of 1.0 wt % of WCl$_6$/toluene solution and 4.3 parts of 2.5 wt % of diisobutyl aluminum mono(n-hexoxide)/toluene solution, the same procedure was followed as in Example 1 to obtain 116 parts of the ring-opening polymer of cyclopentene. Further, a rubber composition was also obtained in the same manner as Example 1. The cyclopentene polymer and the rubber composition obtained were evaluated in the same manner as Example 1. The results are given in Table 1. Further, after keeping the polymer obtained in a −30° C. freezer for 3 days, the obtained polymer was transformed into a resin state, and therefore it was found to be inappropriate for various uses as a rubber like a use in tire.

Comparative Example 4

Except for using 0.091 part of 1-hexene instead of 0.22 part of allyl triethoxy silane, the same procedure was followed as in Example 1 to obtain 100 parts of the ring-opening polymer of cyclopentene. Further, a rubber composition was also obtained in the same manner as Example 1. The cyclopentene polymer and the rubber composition obtained were evaluated in the same manner as Example 1. The results are given in Table 1. Further, even after the polymer obtained was left in a −30° C. freezer for 3 days, it maintained the rubber state.

Comparative Example 5

Except for using 0.095 part of allyl ethyl ether instead of 0.22 part of allyl triethoxy silane, the same procedure was followed as in Example 1 to obtain 80 parts of the ring-opening polymer Of cyclopentene. Further, a rubber composition was also obtained in the same manner as Example 1. The cyclopentene polymer and the rubber composition obtained were evaluated in the same manner as Example 1. The results are given in Table 1. Further, even after the polymer obtained was left in a −30° C. freezer for 3 days, it maintained the rubber state.

Comparative Example 6

Except for using 0.095 part of allyl ethyl ether instead of 0.22 part of allyl triethoxy silane, the same procedure was followed as in Comparative example 3 to obtain 112 parts of the ring-opening polymer of cyclopentene. Further, a rubber composition was also obtained in the same manner as Example 1. The cyclopentene polymer and the rubber composition obtained were evaluated in the same manner as Example 1. The results are given in Table 1. Further, after keeping the polymer obtained in a −30° C. freezer for 3 days, the obtained polymer was transformed into a resin state, and therefore it was found to be inappropriate for various uses as a rubber like a use in tire.

TABLE 1

| | | | | | Ring opening-polymer of cyclopenten | | |
| | | Polymerization catalyst | | Olefinically unsaturated hydrocarbon containing oxysilyl group*[5] | Weight average molecular weight (Mw) | Molecular weight distribution (Mw/Mn) | Cis/Trans ratio |
| --- | --- | --- | --- | --- | --- | --- | --- |
| Ex. 1 | WCl$_6$ | (iBu)$_2$Al(OnHex) | — | Allyl triethoxy silane | 312,800 | 2.05 | 64/36 |
| Ex. 2*[1] | WCl$_6$ | (iBu)$_2$Al(OnHex) | — | Allyl triethoxy silane | 308,900 | 2.04 | 64/36 |
| Ex. 3 | WCl$_6$ | (iBu)$_2$Al(OnBu) | Ethyl acetate | 2-Styryl ethyl trimethoxy silane | 355,800 | 2.01 | 55/45 |

TABLE 1-continued

| | | | | | | | |
|---|---|---|---|---|---|---|---|
| Ex. 4 | WCl$_6$ | (iBu)$_2$Al(OnHex) | 1,4-Dioxane | Allyl tris(trimethyl-siloxy)silane | 277,800 | 2.19 | 65/35 |
| Ex. 5*[2] | WCl$_6$ | (iBu)$_2$Al(OnHex) | — | Allyl triethoxy silane | 331,100 | 3.78 | 64/36 |
| Ex. 6*[3] | WCl$_6$ | (iBu)$_2$Al(OnHex) | — | Allyl triethoxy silane | 312,800 | 2.05 | 64/36 |
| Comp. Ex. 1 | WCl$_6$ | (iBu)$_2$AlOAl(iBu)$_2$ | — | Allyl triethoxy silane | Polymerization did not progress | | |
| Comp. Ex. 2 | WCl$_6$ | (nBu)$_4$Sn | — | Allyl triethoxy silane | 39,500 | 1.94 | 20/80 |
| Comp. Ex. 3 | | Ru catalyst*[4] | — | Allyl triethoxy silane | 156,800 | 1.40 | 17/83 |
| Comp. Ex. 4 | WCl$_6$ | (iBu)$_2$Al(OnHex) | — | 1-Hexene | 291,100 | 2.05 | 65/35 |
| Comp. Ex. 5 | WCl$_6$ | (iBu)$_2$Al(OnHex) | — | Allyl ethyl ether | 275,200 | 1.85 | 65/35 |
| Comp. Ex. 6 | | Ru catalyst*[4] | — | Allyl ethyl ether | 210,800 | 1.55 | 16/84 |

| | Ring opening-polymer of cyclopenten | | | | | Rubber composition Low heat generation property (index) |
|---|---|---|---|---|---|---|
| | Type of oxysilyl group*[6] | Introduction ratio of oxysilyl group*[7] (%) | Mooney viscosity (ML$_{1+4}$,100° C.) | Tg (° C.) | Tm (° C.) | Polymer state after 3 days at −30° C. | |
| Ex. 1 | Triethoxy silyl group | 100 | 36 | −103 | Not observed | Rubber state | 85 |
| Ex. 2*[1] | Trihydroxy silyl group | 100 | 42 | −103 | Not observed | Rubber state | 75 |
| Ex. 3 | Trimethoxy silyl group | 89 | 46 | −101 | Not observed | Rubber state | 87 |
| Ex. 4 | Tris(trimiethylsiloxy) silyl group | 85 | 28 | −102 | Not observed | Rubber state | 80 |
| Ex. 5*[2] | Triethoxy silyl group | 97 | 56 | −102 | Not observed | Rubber state | 82 |
| Ex. 6*[3] | Triethoxy silyl group | 100 | 36 | −103 | Not observed | Rubber state | 68 |
| Comp. Ex. 1 | | Polymerization did not progress | | | | | |
| Comp. Ex. 2 | Triethoxy silyl group | 100 | — | −95 | 4 | Resin state | — |
| Comp. Ex. 3 | Triethoxy silyl group | 100 | 15 | −95 | 18 | Resin state | 95 |
| Comp. Ex. 4 | — | 0 | 18 | −104 | Not observed | Rubber state | 100 |
| Comp. Ex. 5 | Ethoxy group | 95 | 17 | −103 | Not observed | Rubber state | 93 |
| Comp. Ex. 6 | Ethoxy group | 100 | 16 | −94 | 14 | Resin state | 102 |

*[1] Example 2 is an example in which the ring-opening polymer obtained in Example 1 is further subjected to hydrolysis.
*[2] Example 5 is the same example as Example 1 except that, in addition to cyclopentene, vinyl norbornene is used as a monomer for constituting the cyclopentene ring-opening polymer.
*[3] Example 6 is an example in which the ring-opening polymer obtained in Example 1 is used and type of silica and addition amount of a silane coupling agent are modified to produce a rubber composition.
*[4] As Ru catalyst. (1,3-dimethylimidazolidin-2-ylidene)(tricyclohexylphosphine)benzylidene ruthenium dichloride was used.
*[5] In Comparative examples 4, 5, and 6, 1-hexene or allyl ethyl ether was used instead of an olelinically unsaturated hydrocarbon containing an oxysilyl group.
*[6] In Comparative examples 5 and 6, it represented not an oxysilyl group but an ethoxy group.
*[7] In Comparative examples 5 and 6, it represented not the introduction ratio of an oxysilyl group but the introduction ratio of an ethoxy group.

As described in Table 1, the ring-opening polymer of cyclopentene having a cis ratio of the cyclopentene-derived structural units of 30% or more and a weight average molecular weight (Mw) of 100,000 to 1,000,000, and carrying the oxysilyl group at an end of the polymer chain all had an excellent rubber property at low temperature (rubber state was maintained even under condition of −30° C. for 3 days) and an excellent low heat generation property. Further, having Mooney viscosity within the range of 20 to 150, and therefore it was found to have excellent processability (Examples 1 to 6).

Meanwhile, even if there was the oxysilyl group at and end of the polymer chain, when a cis ratio of cyclopentene-derived structural units was less than 30%, the rubber property at low temperature and low heat generation property deteriorate and also the Mooney viscosity was low, indicating poor processability (Comparative examples 2 and 3).

Further, even if a cis ratio of cyclopentene-derived structural units was 30% or more, when the oxysilyl group was not included at an end of the polymer chain, the low heat generation property deteriorates and also the Mooney viscosity was low, indicating poor processability (Comparative example 4).

Further, when an ethoxy group was introduced to an end of the polymer chain instead of the oxysilyl group, the low heat generation property deteriorates. and also the Mooney viscosity was low, indicating poor processability (Comparative examples 5 and 6).

Further, when diisobutyl aluminoxane was used instead of diisobutyl aluminum mono(n-hexoxide), it was difficult to obtain a polymer (Comparative example 1).

The invention claimed is:

1. A method for producing a tire, comprising a step of obtaining a rubber composition by adding silica as a filler to the ring-opening polymer of cyclopentene as a solid state rubber followed by dry kneading, and
   cross-linking the obtained rubber composition,
   wherein, in the ring-opening polymer of cyclopentene, a cis ratio of cyclopentene-derived structural units is 30% or more, the weight average molecular weight (Mw) is 100,000 to 1,000,000, and an oxysilyl group is included at an end of the polymer chain.

2. The method for producing the tire as set forth in claim 1, wherein the ring-opening polymer of cyclopentene is obtained by ring opening polymerization of cyclopentene in the presence of a compound (A) of a transition metal belonging to Group 6 in the Periodic Table, an organoaluminum compound (B) represented by the following general formula (1), and an olefinically unsaturated hydrocarbon (C) containing oxysilyl group, $$(R^1)_{3-x}Al(OR^2)_x \quad (1)$$

wherein in formula (1), $R^1$ and $R^2$ represent a hydrocarbon group having 1 to 20 carbon atoms and x satisfies the requirement $0<x<3$.

3. The method for producing the tire as set forth in claim 2, wherein the R2 represents an alkyl group consisting of sequentially bonded four or more carbon atoms.

4. The method for producing the tire as set forth in claim 1, wherein the oxysilyl group is an alkoxysilyl group, an alkylsiloxysilyl group, or a hydroxysilyl group.

5. The method for producing the tire as set forth in claim 1, wherein the adding amount of the silica is 1 to 150 parts by weight with respect to 100 parts by weight of the rubber component in the rubber composition.

6. The method for producing the tire as set forth in claim 1, wherein a carbon black as the filler is further added in the rubber composition.

7. The method for producing the tire as set forth in claim 6, wherein total adding amount of the silica and carbon black is 25 to 120 parts by weight with respect to the rubber component in the rubber composition.

8. The method for producing the tire as set forth in claim 1, wherein the silica has specific surface area by nitrogen adsorption of preferably 50 to 300 $m^2/g$.

9. The method for producing the tire as set forth in claim 1, wherein a silane coupling agent is further added in the rubber composition.

10. The method for producing the tire as set forth in claim 9, wherein the adding amount of the silane coupling agent is 0.1 to 30 parts by weight with respect to 100 parts by weight of the silica in the rubber composition.

11. The method for producing the tire as set forth in claim 1, wherein an additional rubber other than the ring-opening polymer of cyclopentene as a rubber component is further added in the rubber composition.

12. The method for producing the tire as set forth in claim 11, wherein content ratio of the ring-opening polymer of cyclopentene is 5 to 90 wt % in the rubber components included in the rubber composition.

* * * * *